(12) United States Patent
Memel et al.

(10) Patent No.: US 8,920,248 B2
(45) Date of Patent: Dec. 30, 2014

(54) ELASTIC JOINT BODY

(71) Applicant: SGF Sueddeutsche Gelenkscheibenfabrik GmbH & Co. KG, Waldkraiburg (DE)

(72) Inventors: Karl-Heinz Memel, Muehldorf (DE); Anton Hingerl, Muehldorf (DE); Wolfgang Nindel, Muehldorf (DE); Juergen Tietze, Waldkraiburg (DE)

(73) Assignee: SGF Sueddeutsche Gelenkscheibenfabrik GmbH & Co. KG

( * ) Notice: Subject to any disclaimer, the term of this patent is extended or adjusted under 35 U.S.C. 154(b) by 0 days.

(21) Appl. No.: 13/690,366

(22) Filed: Nov. 30, 2012

(65) Prior Publication Data
US 2013/0143677 A1 Jun. 6, 2013

(30) Foreign Application Priority Data
Dec. 2, 2011 (DE) .................. 20 2011 108 594

(51) Int. Cl.
*F16D 3/62* (2006.01)
*F16D 3/78* (2006.01)

(52) U.S. Cl.
CPC ... *F16D 3/78* (2013.01); *F16D 3/62* (2013.01)
USPC ............................................. 464/69; 464/93

(58) Field of Classification Search
CPC ................ F16D 3/62; F16D 3/68; F16D 3/78
USPC ................................................. 464/69, 93–96
See application file for complete search history.

(56) References Cited

U.S. PATENT DOCUMENTS

| 4,188,802 | A | 2/1980 | Zeidler et al. | |
|---|---|---|---|---|
| 6,702,679 | B2 * | 3/2004 | Ishimoto et al. | ................ 464/69 |
| 7,568,976 | B2 * | 8/2009 | Kirschey | ..................... 464/93 X |

FOREIGN PATENT DOCUMENTS

DE 27 05 598 A1 8/1978

* cited by examiner

*Primary Examiner* — Gregory Binda
(74) *Attorney, Agent, or Firm* — Carter, Deluca, Farrell & Schmidt, LLP

(57) ABSTRACT

An elastic joint body for a shaft arrangement, for the articulated connection of two shaft sections, including a plurality of bushes which are arranged at predetermined angular intervals in the peripheral direction with respect to a central axis of the joint body, a plurality of sets of loops, each set of loops wraps around two adjacent bushes, wherein the bushes and sets of loops are arranged in such a way that a central aperture which extends through the joint body in the direction of the central axis of the latter is formed in the joint body, and at least one gate land on at least one peripheral face that extends in the axial direction, and wherein the bushes and the sets of loops are sheathed, at least partially, with a rubbery-elastic sheathing, starting from the at least one gate land.

19 Claims, 9 Drawing Sheets

ELASTIC JOINT BODY

TECHNICAL FIELD

The present invention relates to an elastic joint body for a shaft arrangement, for the articulated connection of two shaft sections, the joint body having a plurality of bushes which are arranged at predetermined angular intervals in the peripheral direction with respect to a central axis of the joint body, and a plurality of sets of loops, wherein each of the sets of loops wraps around two adjacent bushes. The bushes and sets of loops are arranged in such a way that a central aperture which extends through the joint body in the direction of the central axis of the latter is constructed in the joint body.

BACKGROUND OF RELATED ART

Joint bodies of this kind, which are also often referred to as "joint discs", are known from the prior art and are disclosed, for example, in document DE 27 05 598 A1. The joint body disclosed in that document comprises bushes which are arranged at regular angular intervals around the axis of the joint body and which are wrapped around, two at a time, by filament windings. The bushes and filament windings are embedded together in an elastomeric material. Even the regions between the individual outer bushes are filled up with the elastomeric material in which the filament windings are embedded.

On their faces which extend perpendicularly to the central axis of the joint body, i.e. the axial faces of the joint body, the joint bodies which are known from the prior art have gate features which originate from a point-type or continuous gate. The filament windings and outer bushes are sheathed with the elastomeric material, starting from these gate locations on the axial faces of the joint body. As a result of the sheathing operation from the direction of the central axis of the joint body, the elastomeric material comes into direct contact with the filament windings, which affects the flow behaviour or spreading behaviour of the elastomeric material. Because of these influences, defective configuration of the elastomeric sheathing or of the elastic body of the joint body, and unwanted air inclusions in the elastomeric sheathing, can occur in individual cases. Since the elastomeric sheathing of the bushes and of the filament windings is extremely important to the functioning, including the compensation for angular offsets between shaft sections and the lifespan of the joint body, both elastomeric sheathing of faulty construction and multiplied air inclusions in the elastomeric body can lead to a reduction in the lifespan as well as to impairment of the functioning of the joint body.

SUMMARY

An object of the present invention is to provide a joint body of the kind initially referred to, in which the lifespan can be increased and the functioning of the joint body can be ensured.

In order to achieve the above object, the joint body according to the invention has at least one gate land on at least one peripheral face that extends in the axial direction. The bushes and the sets of loops are sheathed, at least partially, with a rubbery-elastic sheathing, starting from the at least one gate land.

The at least one gate land on at least one peripheral face that extends in the axial direction of the joint body guarantees a more uniform and more reliable construction of the rubbery-elastic sheathing. By means of the at least one gate land, it is possible to better take into account the influence of the sets of loops and bushes when forming the rubbery-elastic sheathing. In addition, it is thereby possible to reduce the occurrence of air inclusions in the rubbery-elastic sheathing.

The rubbery-elastic sheathing of the joint body, which sheathing is of uniform and complete construction, leads to an increased lifespan of the joint body and contributes to ensuring functioning of the joint body which is satisfactory on a long-term basis.

According to one embodiment of the invention, the at least one gate land may extend in the direction of the central axis of the joint body.

Furthermore, according to another embodiment of the invention, the at least one gate land may extend in the peripheral direction of the joint body.

The two embodiments described above do not necessarily represent alternatives to one another, but may also be combined. Accordingly, the joint body according to the invention may have both at least one gate land that extends in the axial direction and also at least one gate land that runs in the peripheral direction on the peripheral faces of the joint body.

According to a further development of the invention, the at least one gate land may completely surround at least one of the peripheral faces of the joint body. In other words, the joint body may comprise a circumferential gate land on at least one peripheral face.

According to one embodiment of the invention, a plurality of gate lands may extend in the peripheral direction of the joint body on at least one of its peripheral faces. In this case, each gate land of the plurality of gate lands may also span only a partial region of at least one of the peripheral faces of the joint body.

The individual gate lands of the plurality of gate lands may also be offset in the axial direction in relation to one another.

According to one embodiment of the invention, the at least one gate land may be provided in the region of the central aperture on an inner peripheral face. By means of the central aperture of predetermined construction and dimensions, the at least one axial gate land may be formed via a central gate system. The sets of loops and the bushes are thus sheathed starting from the axial gate land in the region of the central aperture. As the central gate system, use may be made, for example, of a film gate system in which the rubbery-elastic sheathing is formed in the shape of a film or a strip, starting from the at least one gate land that extends in the axial direction.

In addition to, or as an alternative to, the axial gate land in the region of the inner peripheral face of the central aperture, at least one axial gate land may be provided on an outer peripheral face of the joint body.

The central aperture of the joint body, which aperture is of predetermined construction, may be of substantially round or even multi-angular (polygonal) construction. In this case, its inner peripheral face extends in the direction of the central axis of the joint body.

The at least one gate land that extends in the direction of the central axis of the joint body runs substantially parallel or obliquely to the central axis of the joint body.

Depending upon the shape or dimensioning of the joint body, the at least one gate land that extends in the axial direction may extend over the entire axial extension of the joint body, or only over a part thereof. Accordingly, the extension of the at least one gate land in the axial direction of the joint body may be smaller than the entire extension of the joint body in the axial direction. As an alternative to this, the at least one gate land may extend over the entire axial extension of the joint body in the direction of the central axis.

According to one embodiment of the present invention, at least six gate lands are provided on the inner peripheral face of the central aperture of the joint body. All of the six gate lands may extend in the axial direction of the joint body. The at least six gate lands that extend in the axial direction of the joint body may be arranged around the central axis of the joint body at regular angular intervals in relation to one another. In other words, the bushes and the sets of loops are sheathed with the rubbery-elastic sheathing, starting from the six axial gate lands. The axial gate lands, which are arranged so as to be offset in relation to one another, lead to a rubbery-elastic sheathing of uniform construction, with a reduced occurrence of air inclusions.

According to one embodiment of the invention, when the joint body is formed, a plurality of bushes and a plurality of sets of loops that wrap around two adjacent bushes are arranged in an injection mould. The elastomer composition that forms the rubbery-elastic sheathing can then be introduced into the injection mould, starting from the central aperture which is to be constructed in the joint body, in such a way that at least one gate land that extends in the axial direction of the joint body is formed on the inner peripheral face of the central aperture of the joint body. Starting from the at least one axial gate land, the sets of loops and the bushes are sheathed, at least partially, by the elastomer composition that forms the rubbery-elastic sheathing.

With the aid of the at least one axially extending gate land, the bushes and the sets of loops can be sheathed in a uniform manner, virtually over the entire axial extension of the elastic joint body, with the rubbery-elastic sheathing. What can also be achieved by means of the at least one axial gate land is that the rubbery-elastic sheathing is formed by means of a displacement flow and, in that way, sheathes the sets of loops and the bushes. A displacement flow that is made possible by the at least one axial gate land leads to more uniform, and thereby improved, flow behaviour of the elastomer composition, so that the rubbery-elastic sheathing is formed in a uniform and complete manner with a simultaneous reduction in the risk of air inclusions.

According to one embodiment of the invention, there may be associated with each bush flanged bushes which are provided at the axial ends, in each case, of the bushes and which are sheathed, at least partially, by the rubbery-elastic sheathing. The flanged bushes serve, inter alia, to support the sets of loops in the axial direction of the bushes and to thus better retain the sets of loops in their predetermined position on the bushes.

According to the invention, provision may be made for the rubbery-elastic sheathing of the joint body to have, on each of its faces that run perpendicularly to the central axis of the joint body, at least one clearance in the region between two adjacent bushes. These clearances on the axial faces of the joint body lead to the possibility of the rubbery-elastic sheathing deforming in the region between the bushes when the joint body is in operation, i.e. when torque is being transmitted. Furthermore, the clearances may also extend in a region between two strands of a set of loops that wraps around two adjacent bushes.

The present invention also relates to a shaft arrangement, in particular a drive line of a vehicle having a joint body of the kind described above.

BRIEF DESCRIPTION OF THE DRAWINGS

The embodiments of the invention will be described below with reference to the appended drawings, in which.

DETAILED DESCRIPTION

Figure 1:
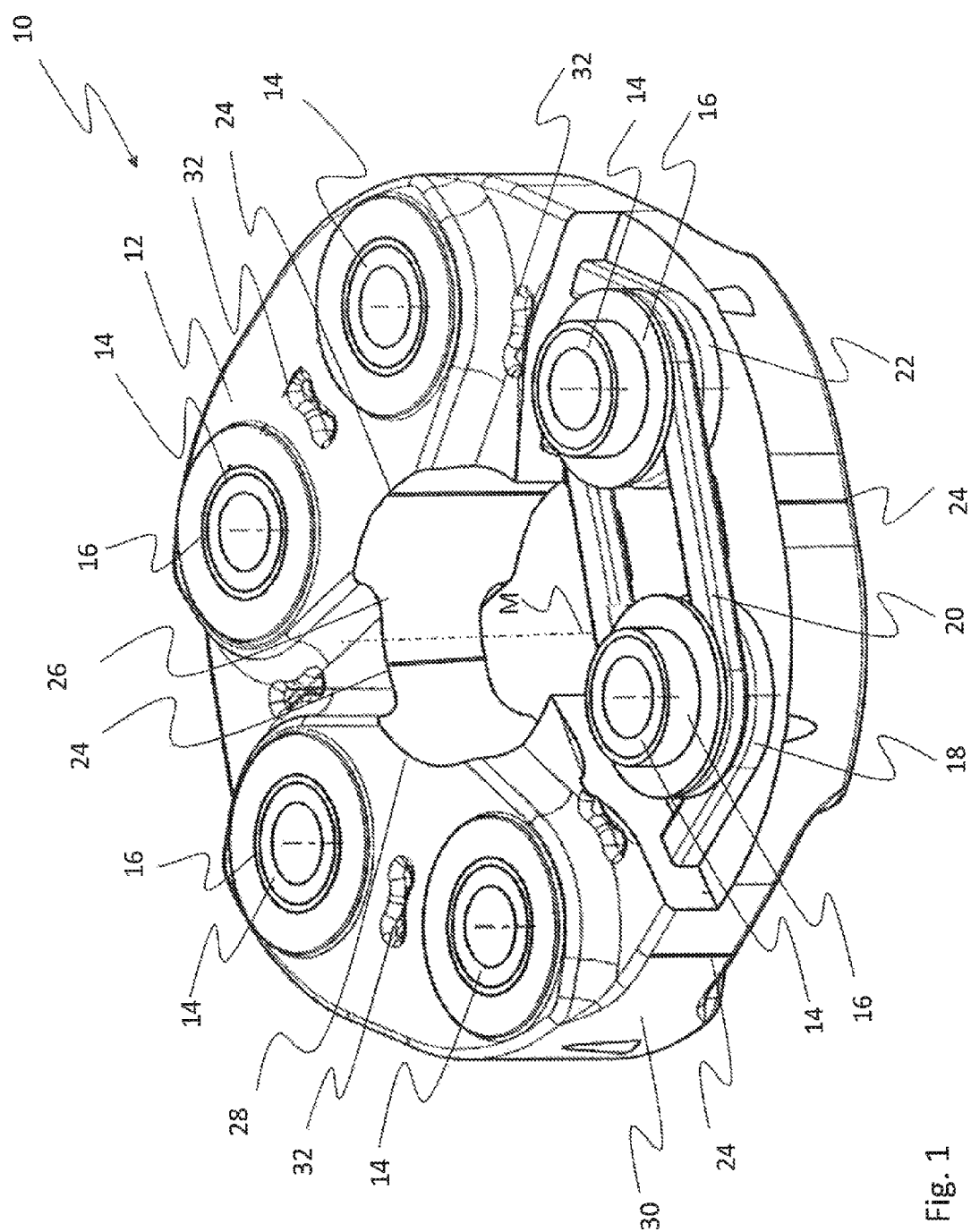
FIG. 1 represents a perspective view of a joint body according to a first embodiment of the invention.

FIG. 1 shows a perspective view of a first embodiment of the elastic joint body 10 according to the invention, with six bushes 14 which are sheathed by a rubbery-elastic sheathing 12. The bushes 14 are arranged at predetermined angular intervals on the joint body 10 in the peripheral direction with respect to a central axis M. In that region of the joint body 10 acts cording to FIG. 1 which is represented in cut-away form in the drawing, there can be seen the flange elements 16 on the bushes 14, which elements are provided for axially supporting the sets of loops 18, 20 and 22. Both the flanged bushes 16 and the sets of loops 18, 20 and 22 are sheathed by the rubbery-elastic sheathing 12.

It can also be seen from FIG. 1 that an individual bush 14 is wrapped around, in each case, by a number of sets of loops 18, 20 or 20, 22. As shown, the loop 20 wraps around two adjacent bushes 14 and loop 18 wraps around two adjacent bushes 14. Under these circumstances, provision may be made for the sets of loops 18, 22 to be stressed by a tensile force when the joint body 10 is in the installed condition in a shaft arrangement, while the set of loops 20 and another, parallel set of loops, which is not shown in FIG. 1 but which is sheathed by the rubbery-elastic sheathing 12, is loaded in compression or shear.

The rubbery-elastic sheathing 12 may be formed of an elastomer composition that is introduced into an injection mould (not shown) in such a way that a gate land 24 is formed on the inner peripheral faces 26 of the joint body 10. The joint body 10 additionally has gate lands 24 which extend in the direction of the central axis M. The axial gate lands 24 may be provided on an inner peripheral face 26 of a central aperture 28 in the joint body 10 or joint disc and on an outer peripheral face 30 of the joint body 10. However it is sufficient, for the design and manufacture of the joint body 10, if the axial gate lands 24 are arranged either on the inner peripheral face 26 of the central aperture 28 or the outer peripheral face 30 of the joint body 10. According to this embodiment of the invention, the gate lands 24 extend parallel to the central axis M. The bushes 14, the flanged bushes 16 and the sets of loops 18, 20, 22 are sheathed, starting from the gate lands 24, with the rubbery-elastic sheathing 12.

The bushes 14, the flanged bushes 16 and the sets of loops 18, 20, 22 are sheathed, starting from the gate lands 24, with the rubbery-elastic sheathing 12.

According to this embodiment of the invention, the axial gate lands 24 extend over the entire axial extension of the joint body 10. However, the gate lands 24 do not necessarily have to be designed in this way, but may also extend only over partial sections of the axial extension of the joint body 10.

In the region between the bushes 14, the joint body 10 also has clearances 32. The purpose of the clearances 32 is that the joint body 10, or the rubbery-elastic sheathing 12, is able to deform when in operation, i.e. when torque is being transmitted between two shaft sections (not shown). In other words, the clearances 32 allow individual bushes 14 to come closer to one another when the joint body 10 is in operation.

Figure 2:
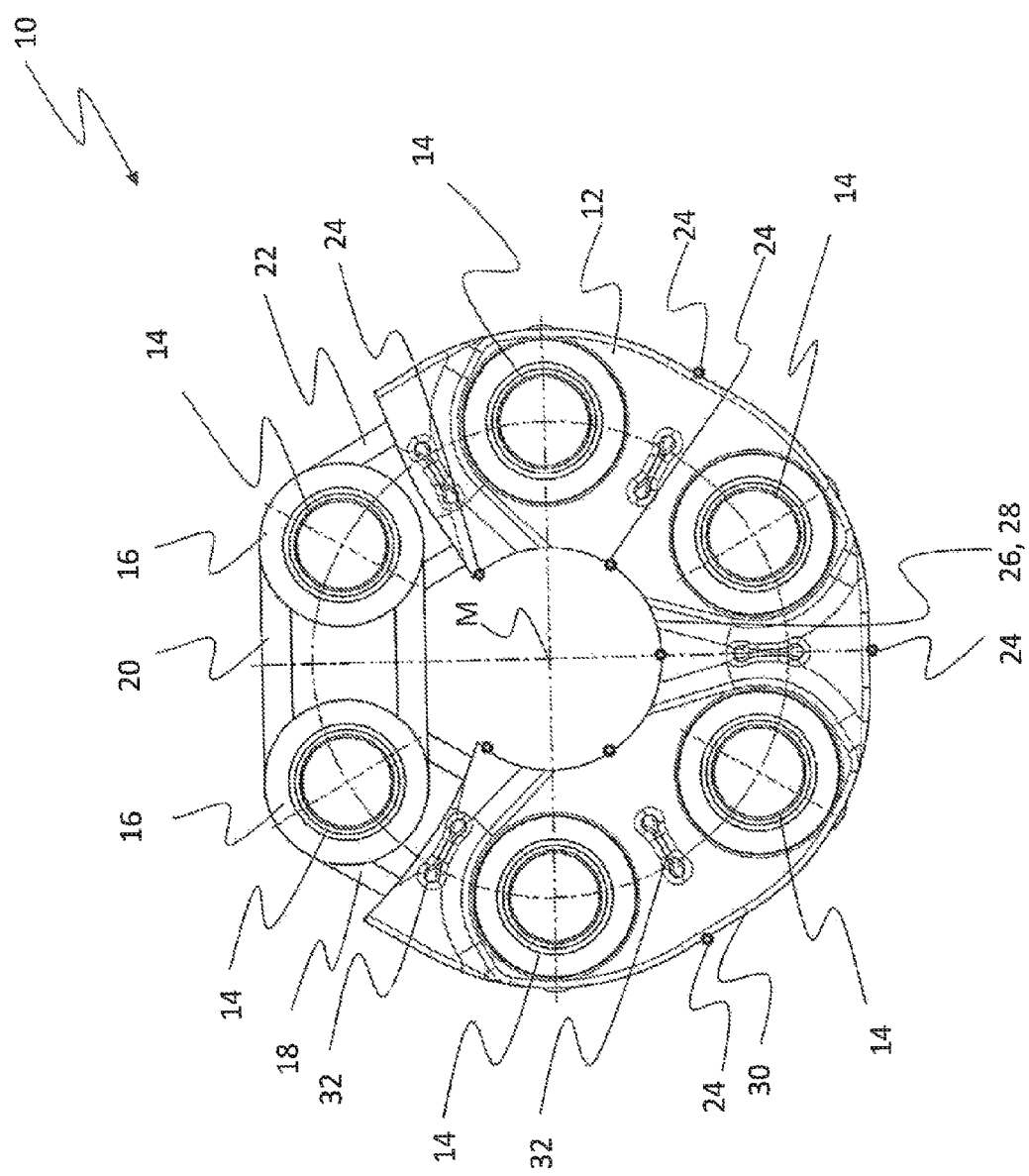
FIG. 2 represents a top view of the joint body according to FIG. 1.

FIG. 2 shows a partially cut-away top view of the elastic joint body 10 according to FIG. 1. In that region of the joint body 10 which is represented in cut-away form in the drawing, there can once again be seen the flange elements 16 on the bushes 14, which elements are provided for axially supporting the sets of loops 18, 20 and 22.

The top view according to FIG. 2 likewise shows the gate lands 24. The gate lands 24 are ribs formed on the inner peripheral face 26 of the central aperture 28 and the outer peripheral face 30. The gate lands 24 are arranged at regular angular intervals around the central axis M and extend in the axial direction of the joint body 10.

Figure 3:
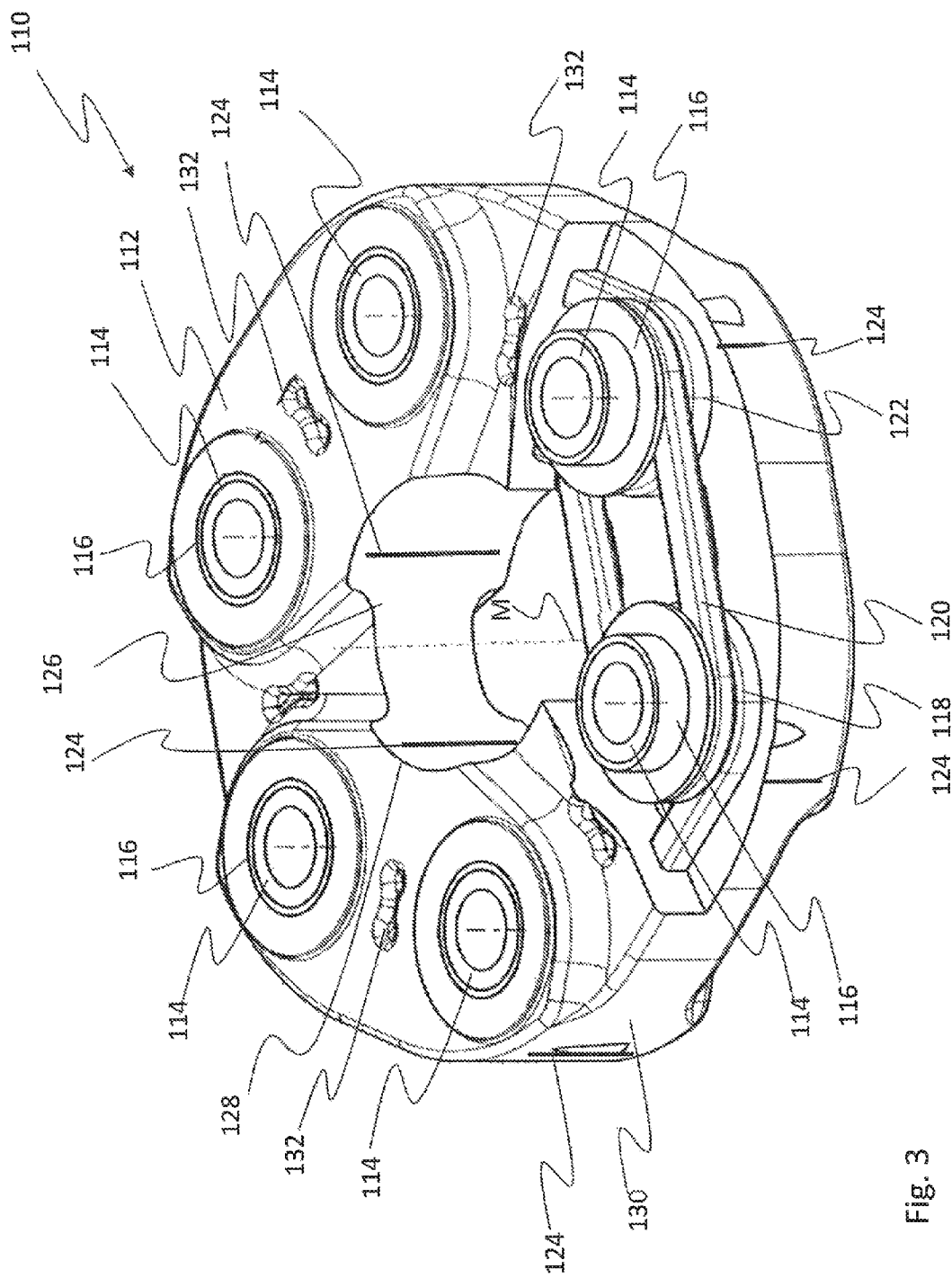
FIG. 3 represents a perspective view of a joint body according to a second embodiment of the invention.

FIG. 3 shows a perspective view of a joint body 110 according to a second embodiment of the invention.

The joint body 110 corresponds, to a large extent, to the joint body 10 described with reference to FIGS. 1 and 2, but in the joint body 110, the gate lands 124 are arranged in line with the axes of the bushes 114.

It can also be seen in FIG. 3 that, according to this embodiment, the axial gate lands 124 span only a partial region of the axial extension of the joint body 110. Accordingly, the axial gate lands 124 do not reach as far as the edges of the joint body 110, but extend in a central region of the axial extension of the latter.

Figure 4:
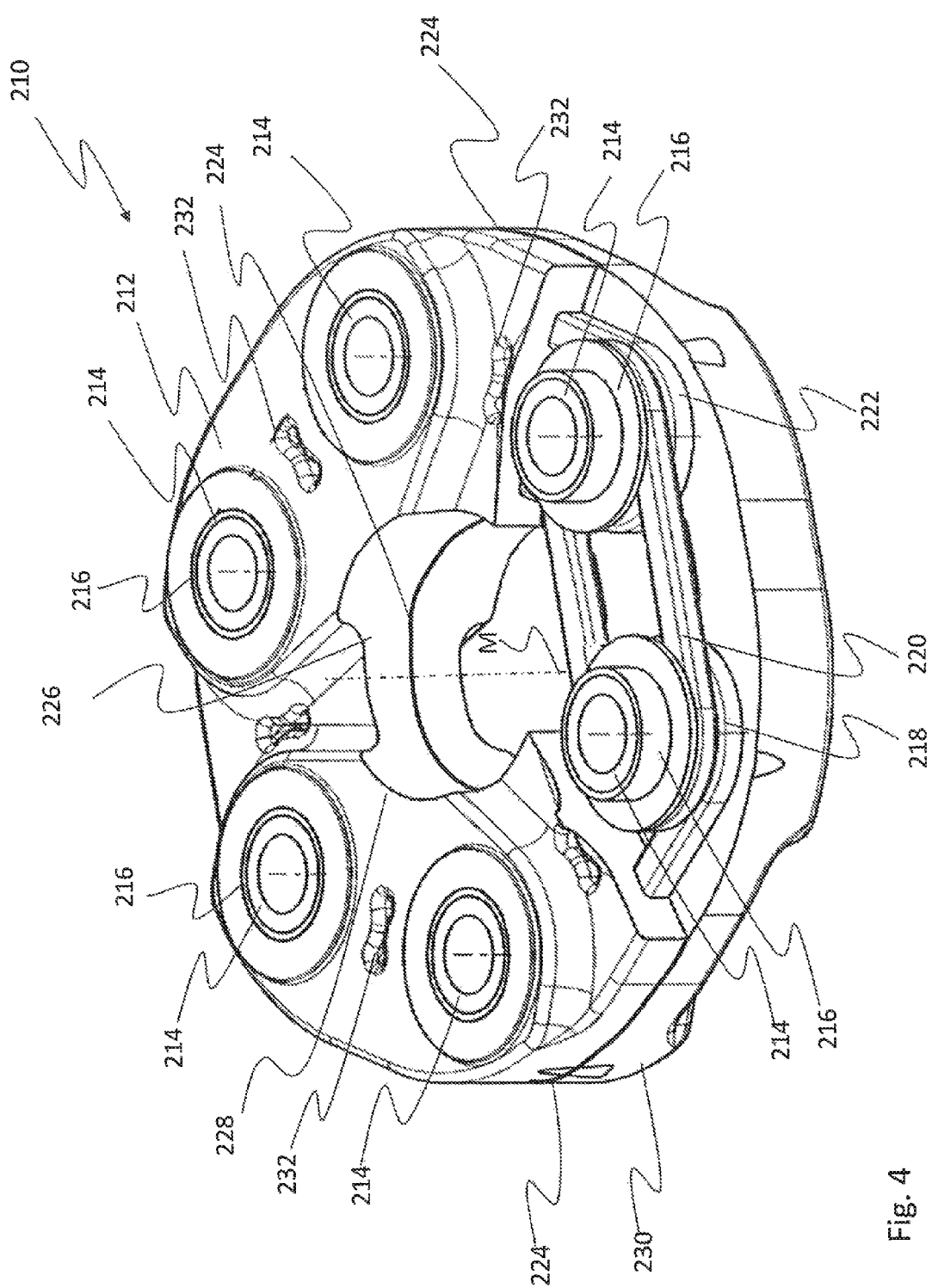
FIG. 4 represents a perspective view of a joint body according to a third embodiment of the invention.

FIG. 4 shows a perspective view of a joint body 210 according to a third embodiment of the invention.

The gate lands 224 of the joint body 210 extend in the peripheral direction of the latter. In this instance, the gate lands 224 run along the inner peripheral face 226 of the central aperture 228 or along the outer peripheral face 230 of the joint body 210. In other words, the gate lands 224 run completely round the inner peripheral face 226 and the outer peripheral face 230, the gate lands 224 according to this embodiment being provided in a central region of the axial extension of the joint body 210.

However, the gate lands 224 do not have to be arranged on the inner peripheral face 226 and on the outer peripheral face 230. It is sufficient if the gate lands 224 that extend in the peripheral direction are arranged either on the inner peripheral face 226 of the central aperture 228 or on the outer peripheral face 230 of the joint body 210.

Figure 5:
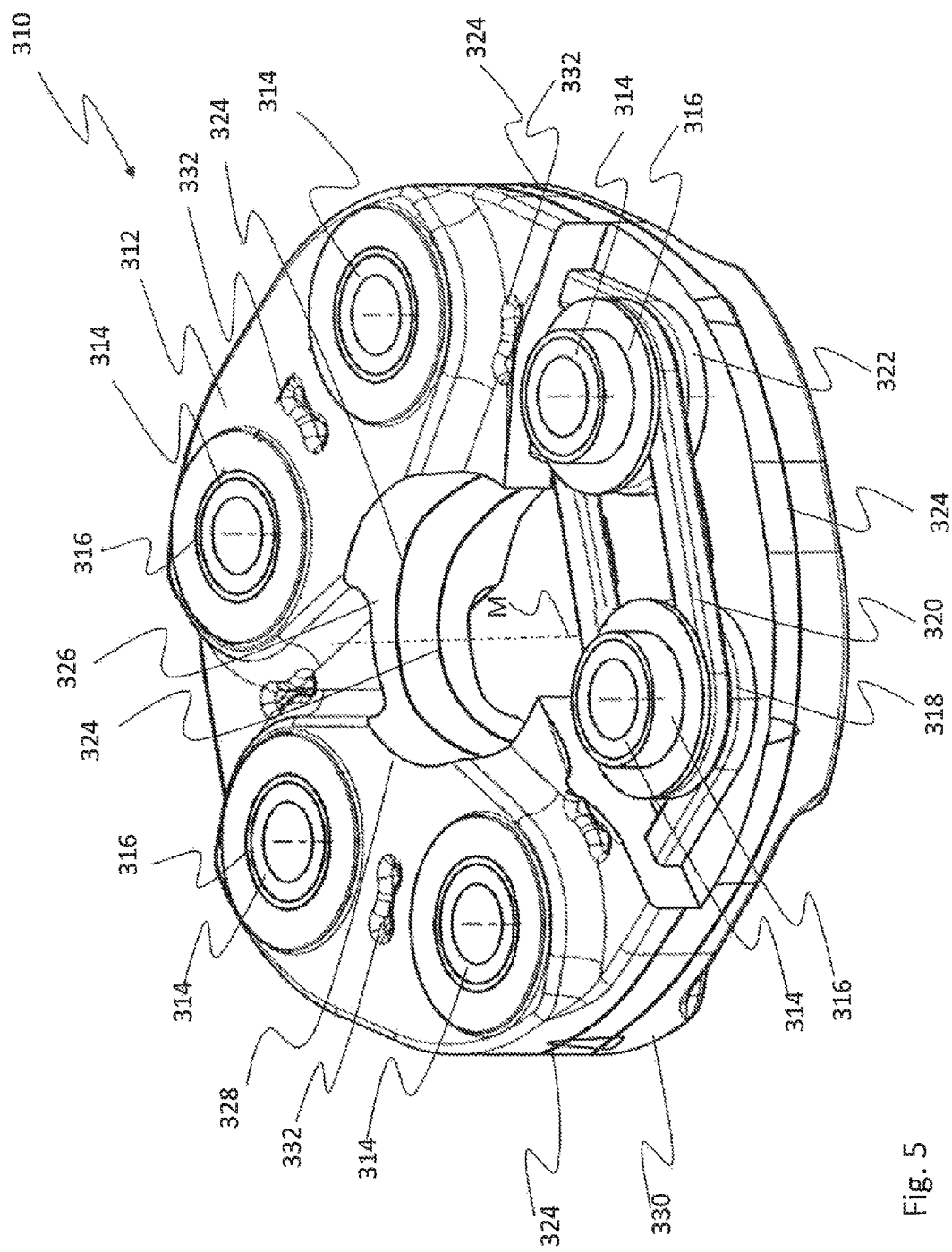
FIG. 5 represents a perspective view of a joint body according to a fourth embodiment of the invention.

FIG. 5 shows a perspective view of the joint body 310 according to a fourth embodiment of the invention.

The joint body 310 comprises two gate lands 324 which run parallel to one another and extend in the peripheral direction of the joint body 310 on the inner peripheral face 326 and the outer peripheral face 330. The gate lands 324 completely surround the inner peripheral face 324 and the outer peripheral face 330.

Naturally it is also possible for more than two gate lands 324 to be provided on the inner peripheral face 326 and/or the outer peripheral face 330.

Figure 6:
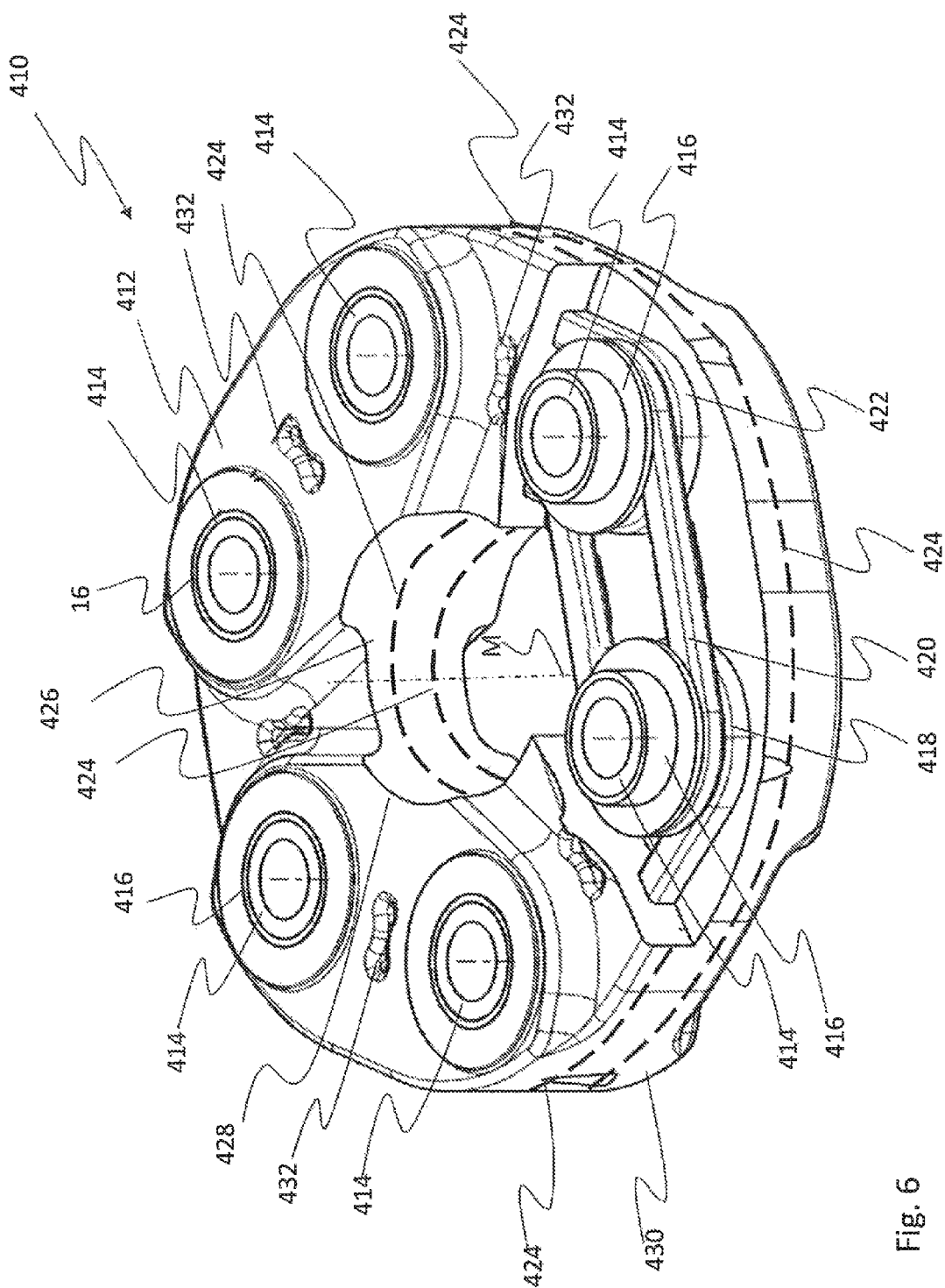
FIG. 6 represents a perspective view of a joint body according to a fifth embodiment of the invention.

FIG. 6 shows a perspective view of a joint body 410 according to a fifth embodiment of the invention.

The joint body 410 comprises a plurality of gate lands 424 which extend in the peripheral direction of the joint body 410 on the outer peripheral face 430 and the inner peripheral face 426 of the central aperture 428. In this instance, each of the gate lands 424 spans a partial region of the inner peripheral face 426 or of the outer peripheral face 430 of the joint body 410.

Figure 7:
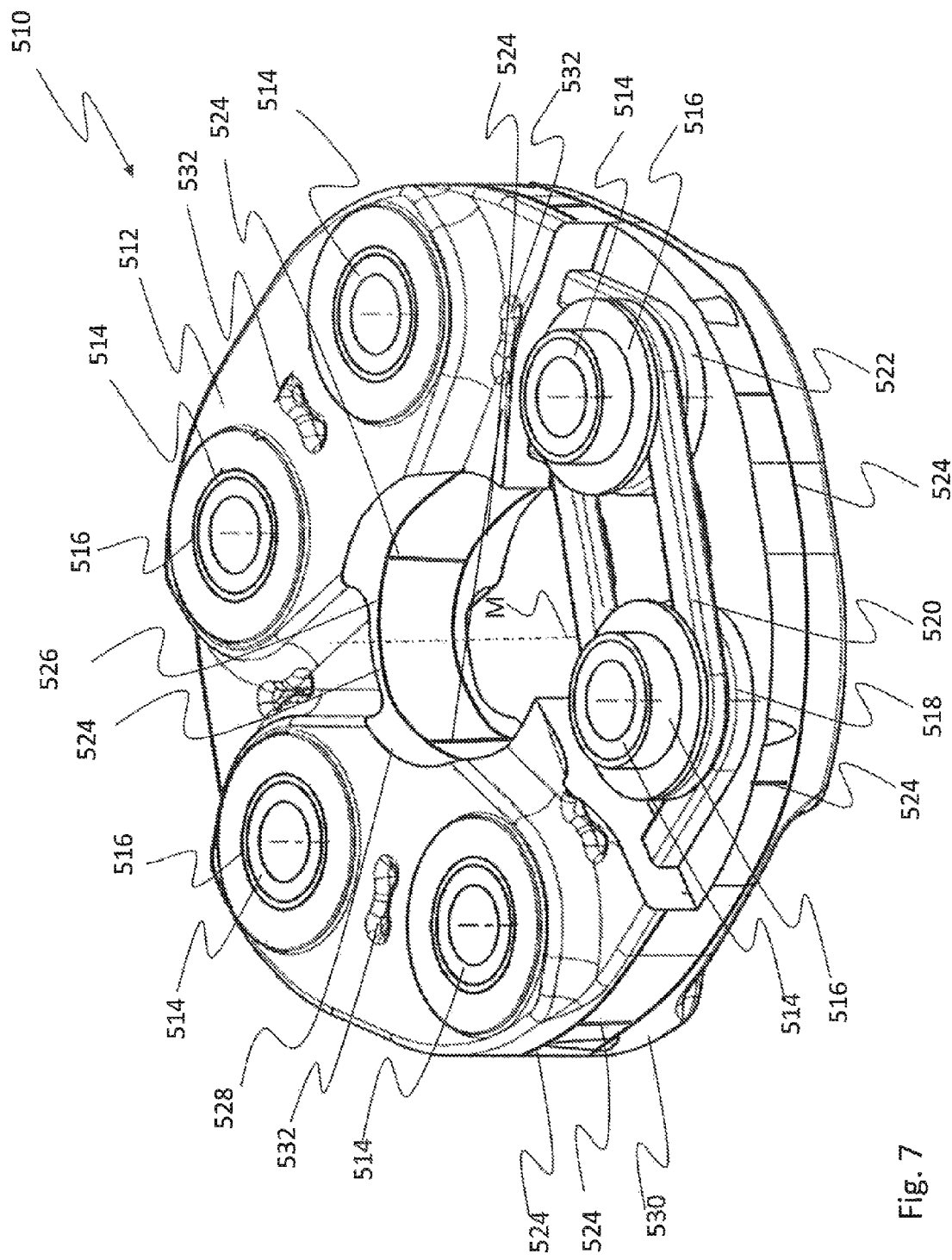
FIG. 7 represents a perspective view of a joint body according to a sixth embodiment of the invention.

FIG. 7 shows a perspective view of a joint body 510 according to a sixth embodiment of the invention.

The joint body 510 has both gate lands 524 that extend in the axial direction and gate lands 524 that run in the peripheral direction of the joint body 510 along the outer peripheral face 530 and the inner peripheral face 526. In this instance, provision may be made for the axial gate lands 524 to extend between the gate lands 524 that run in the peripheral direction of the joint body 510. However, this is not obligatory.

Figure 8:
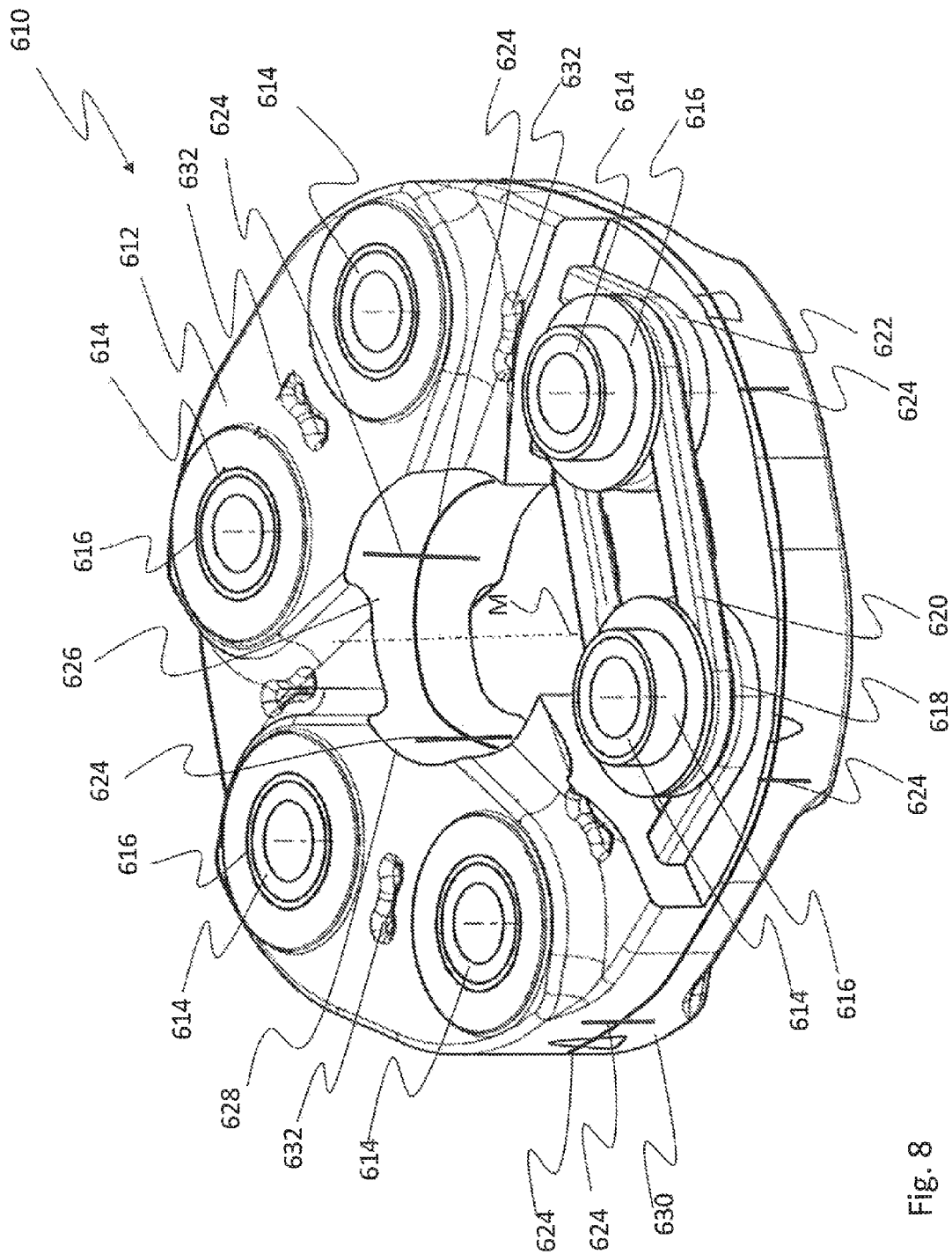
FIG. 8 represents a perspective view of a joint body according to a seventh embodiment of the invention.

FIG. 8 shows a perspective view of a joint body 610 according to a seventh embodiment of the invention.

The joint body 610 according to FIG. 8 has a gate land 624, on the inner peripheral face 626 and on the outer peripheral face 630 in each case, that extends in the peripheral direction of the joint body 610, i.e. equatorially. The gate lands 624 that extend in the peripheral direction are arranged substantially centrally on the inner peripheral face 626 and outer peripheral face 630 and thus "cross" the gate lands 624 that extend in the axial direction.

Figure 9:
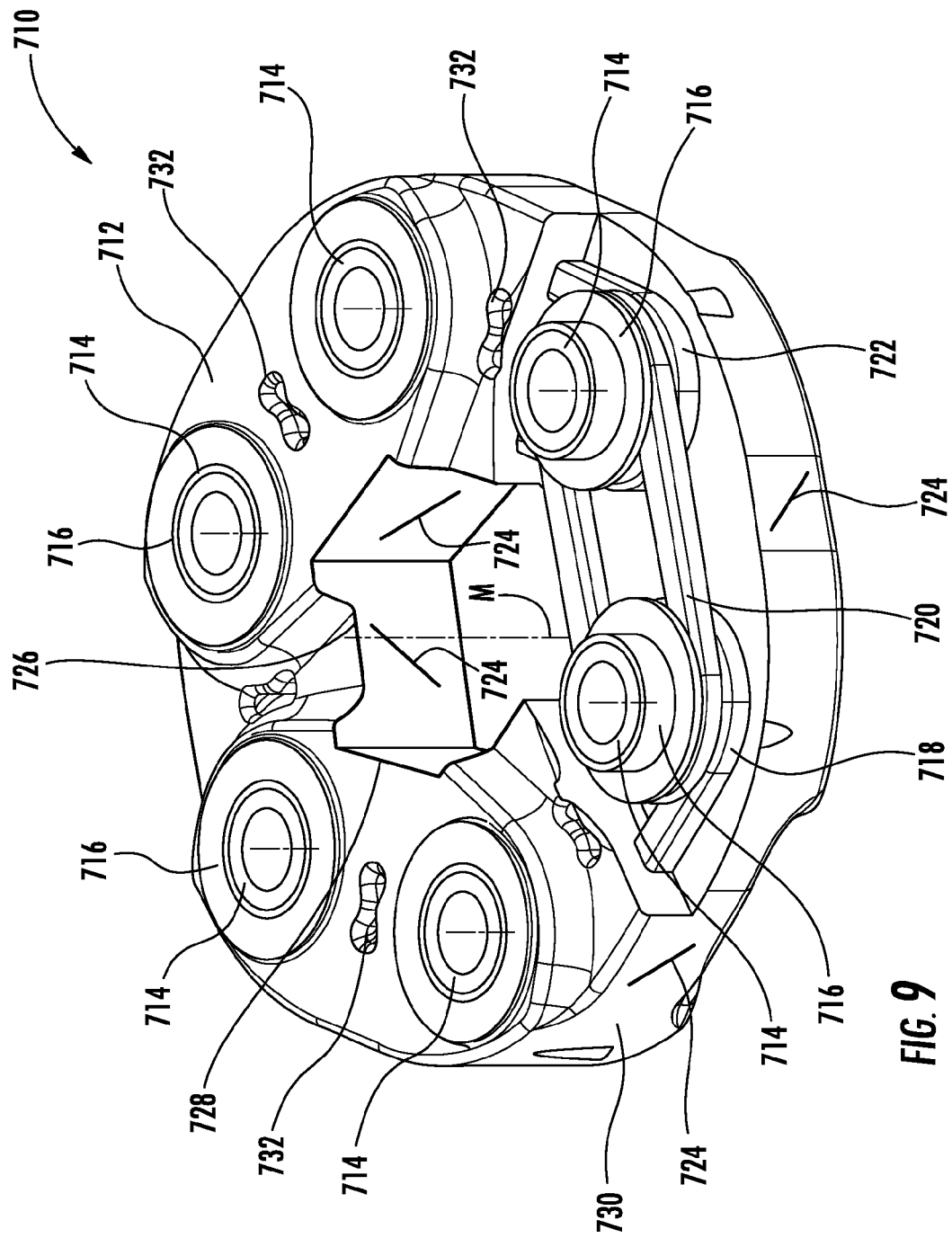
FIG. 9 represents a perspective view of a joint body according to an eighth embodiment of the invention.

FIG. 9 shows a perspective view of a joint body 710 according to an eight embodiment of the invention.

The joint body 710 according to FIG. 9 defines a multi-angular central aperture 728 arranged about the central axis M. As shown in FIG. 9, the central aperture 728 has six inner peripheral faces 726; however, it is within the scope of this disclosure for the central aperture 728 to have less than six inner peripheral faces 726 or more than six inner peripheral faces 726. A gate land 724 may be disposed on the inner peripheral faces 726 and on an outer peripheral face 730 of the joint body 710. The gate lands 724 extend oblique to the central axis M.

All embodiments described above can be combined with one another.

Even though, in each of the embodiment described above, gate lands were provided on the inner peripheral face and the outer peripheral face of the joint body, it is sufficient, for the design and manufacture of the joint body, if the axial gate lands are arranged either on the inner peripheral face or on the outer peripheral face of the joint body.

What is claimed:

1. An elastic joint body for a shaft arrangement, for the articulated connection of two shaft sections, comprising:
   a plurality of bushes which are arranged at predetermined angular intervals in the peripheral direction with respect to a central axis of the elastic joint body;
   a plurality of sets of loops, each set of loops wraps around two adjacent bushes, wherein the plurality of bushes and plurality of sets of loops are arranged in such a way that a central aperture which extends through the elastic joint body in the direction of the central axis of the latter is formed in the elastic joint body; and
   at least one gate land on at least one peripheral face of the elastic joint body that extends in the axial direction, wherein the at least one gate land is a rib formed by sheathing the plurality of bushes and the plurality of sets of loops, at least partially, with a rubbery-elastic sheathing, starting from the at least one gate land.

2. The elastic joint body according to claim 1, wherein the at least one gate land extends in the direction of the central axis of the elastic joint body.

3. The elastic joint body according to claim 1, wherein the at least one gate land extends in the peripheral direction of the elastic joint body.

4. The elastic joint body according to claim 3, wherein the at least one gate land completely surrounds at least one peripheral face of the elastic joint body.

5. The elastic joint body according to claim 3, wherein a plurality of gate lands extends in the peripheral direction of the elastic joint body on at least one of its peripheral faces, and wherein each gate land of the plurality of gate lands spans a partial region of at least one of the peripheral faces of the elastic joint body.

6. The elastic joint body according to claim 5, wherein the gate lands of the plurality of gate lands are offset in an axial direction in relation to one another.

7. The elastic joint body according to claim 1, wherein the at least one gate land is arranged in a region of the central aperture on an inner peripheral face.

8. The elastic joint body according to claim 1, wherein the at least one gate land is arranged on an outer peripheral face of the elastic joint body.

9. The elastic joint body according to claim 1, wherein the central aperture is of substantially round or multi-angular construction and an inner peripheral face extends in the direction of the central axis of the elastic joint body.

10. The elastic joint body according to claim 1, wherein the at least one gate land extends substantially parallel or obliquely to the central axis of the joint body.

11. The elastic joint body according to claim 1, wherein the extension of the at least one gate land in the axial direction of the elastic joint body is smaller than an entire extension of the elastic joint body in the axial direction.

12. The elastic joint body according to claim 1, wherein the at least one gate land extends over an entire axial extension of the elastic joint body.

13. The elastic joint body according to claim 1, wherein at least six gate lands are provided on an inner peripheral face of the central aperture of the elastic joint body and extend in the axial direction of the elastic joint body, and wherein the at least six gate lands are offset in relation to one another by a predetermined angle around the central axis of the elastic joint body.

14. The elastic joint body according to claim 1, wherein the elastic joint body is formed by an arrangement, in an injection mould, of a plurality of bushes and a plurality of sets of loops that wrap around two adjacent bushes, wherein an elastomer composition that forms the rubbery-elastic sheathing can be introduced into the injection mould in such a way that at least one gate land is formed on one of the two inner peripheral faces of the elastic joint body that extend in the direction of the central axis of the elastic joint body, and wherein the plurality of sets of loops and the plurality of bushes can be sheathed at least partially, starting from the at least one gate land, by the elastomer composition that forms the rubbery-elastic sheathing.

15. The elastic joint body according to claim 1, wherein flange elements are associated with each bush, which are provided at each of the axial ends, in each case, of the plurality of bushes and which are sheathed, at least partially, by the rubbery-elastic sheathing.

16. The elastic joint body according to claim 1, wherein the rubbery-elastic sheathing of the elastic joint body has, on each of its faces that run perpendicularly to the central axis of the elastic joint body, at least one clearance in a region between two adjacent bushes.

17. A shaft arrangement comprising an elastic joint body according to claim 1.

18. The shaft arrangement according to claim 17, wherein the shaft arrangement is a drive line of a vehicle.

19. The elastic joint body according to claim 1, wherein the at least one gate land is formed by introducing an elastomer composition into an injection mould.

* * * * *